May 7, 1946.                B. THOMSON                2,399,954
                         REMOTE CONTROL SYSTEM
                         Filed June 18, 1941              9 Sheets-Sheet 1
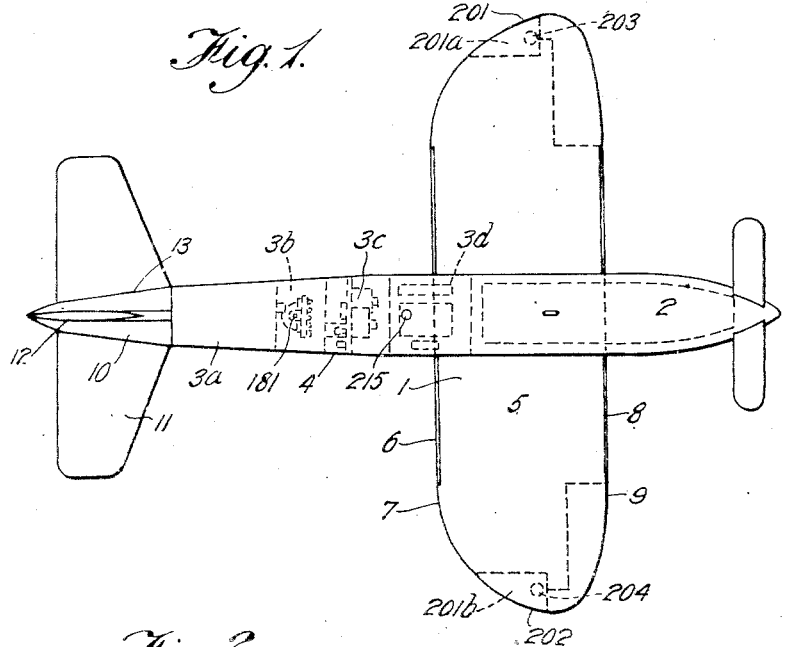
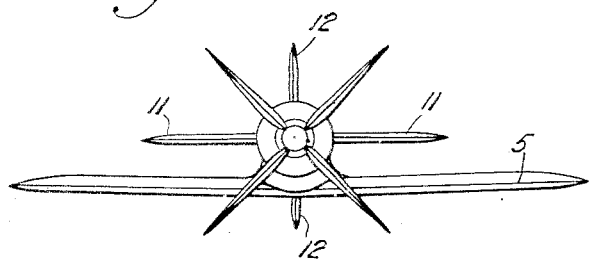
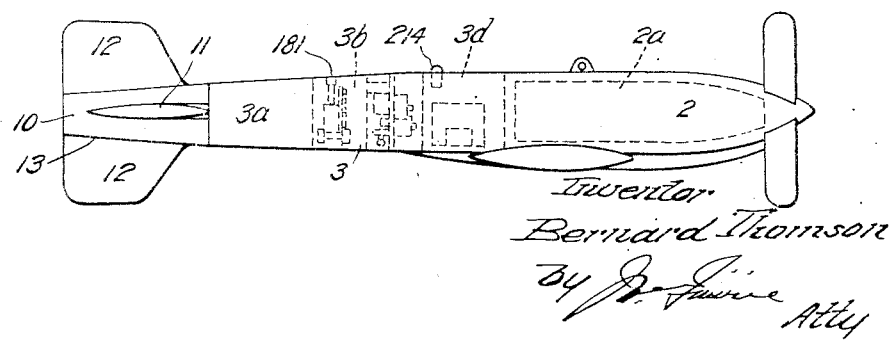
Inventor.
Bernard Thomson Inventor
Bernard Thomson
By J. Swine
Atty.

May 7, 1946.  B. THOMSON  2,399,954
REMOTE CONTROL SYSTEM
Filed June 18, 1941  9 Sheets-Sheet 3
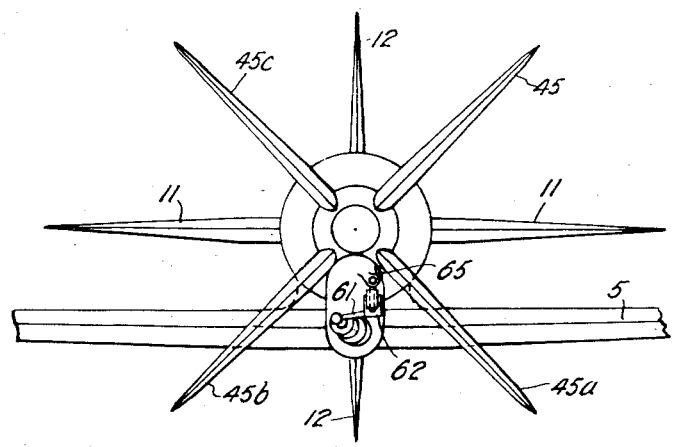

May 7, 1946. B. THOMSON 2,399,954
REMOTE CONTROL SYSTEM
Filed June 18, 1941 9 Sheets-Sheet 4
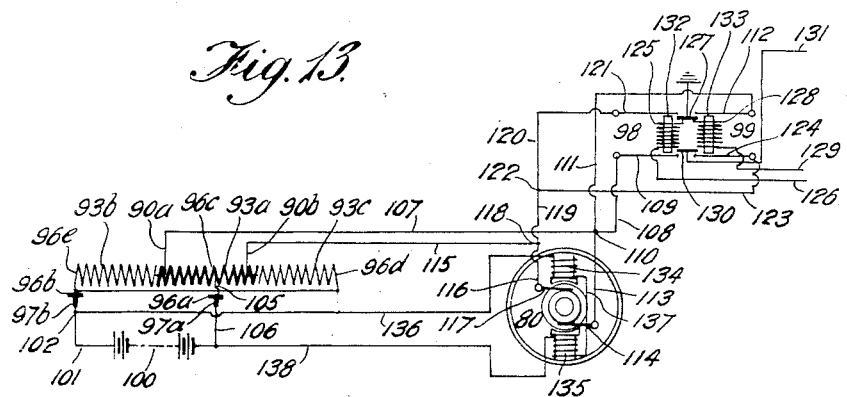
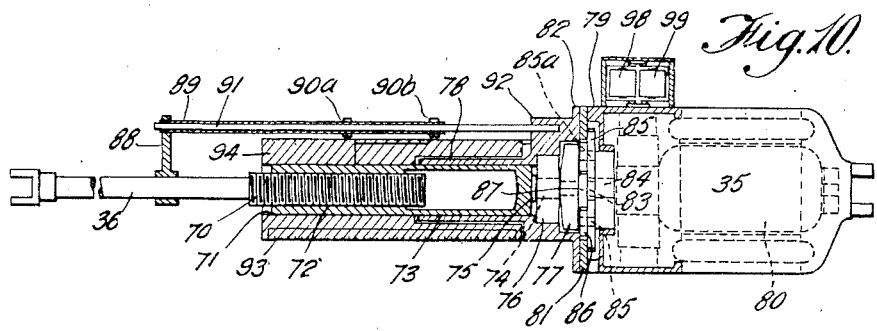
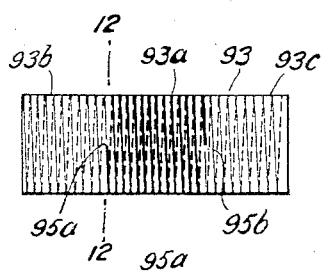
Inventor
Bernard Thomson
By [signature]
Atty.

May 7, 1946. B. THOMSON 2,399,954
REMOTE CONTROL SYSTEM
Filed June 18, 1941 9 Sheets-Sheet 5
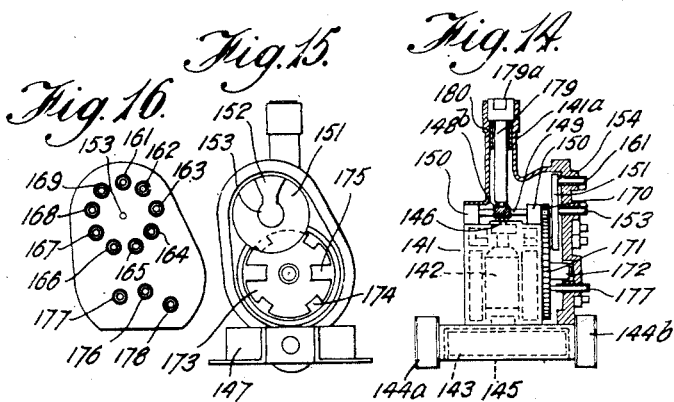
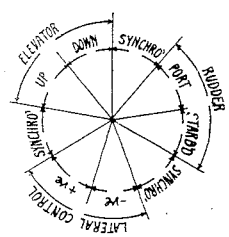
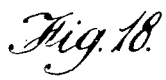
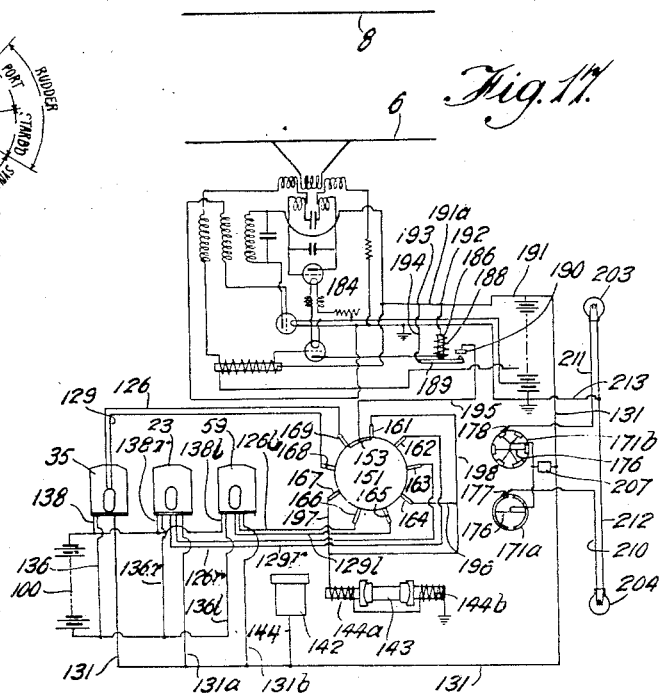
Inventor
Bernard Thomson
By [signature] Atty.

May 7, 1946. B. THOMSON 2,399,954
REMOTE CONTROL SYSTEM
Filed June 18, 1941 9 Sheets-Sheet 6
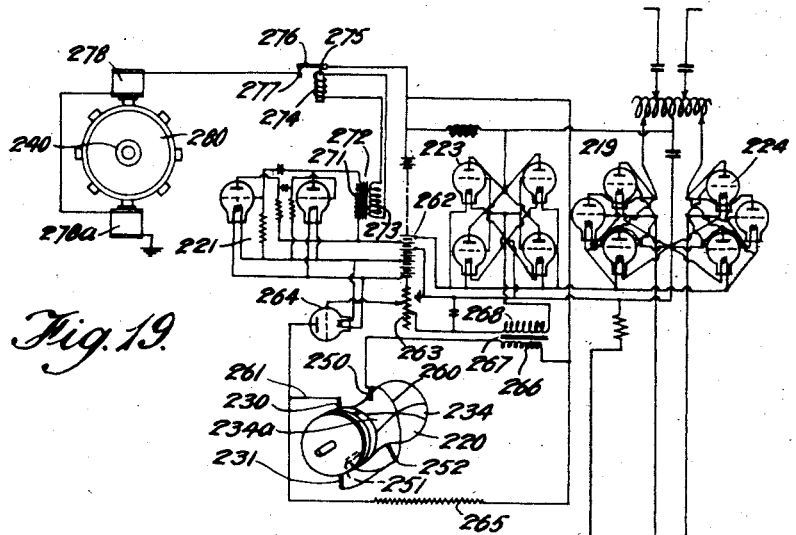
Fig. 19.
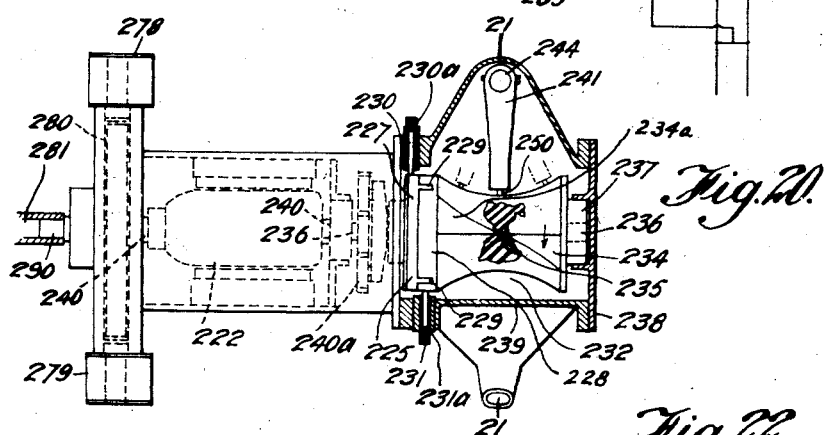
Fig. 20.
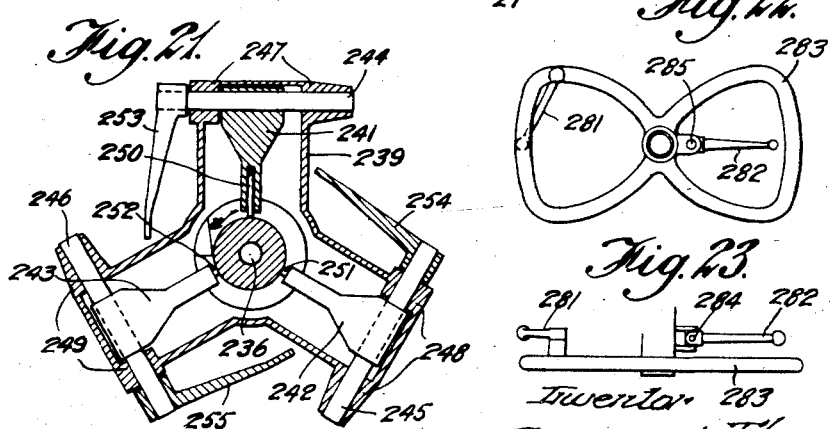
Fig. 21.
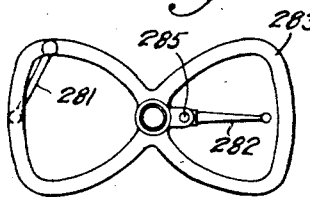
Fig. 22.
Fig. 23.
Inventor
Bernard Thomson
By Jas. Lunine
Atty

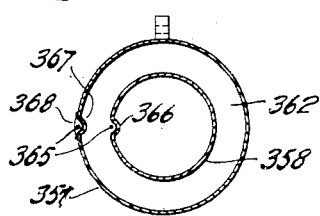
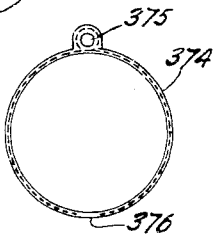
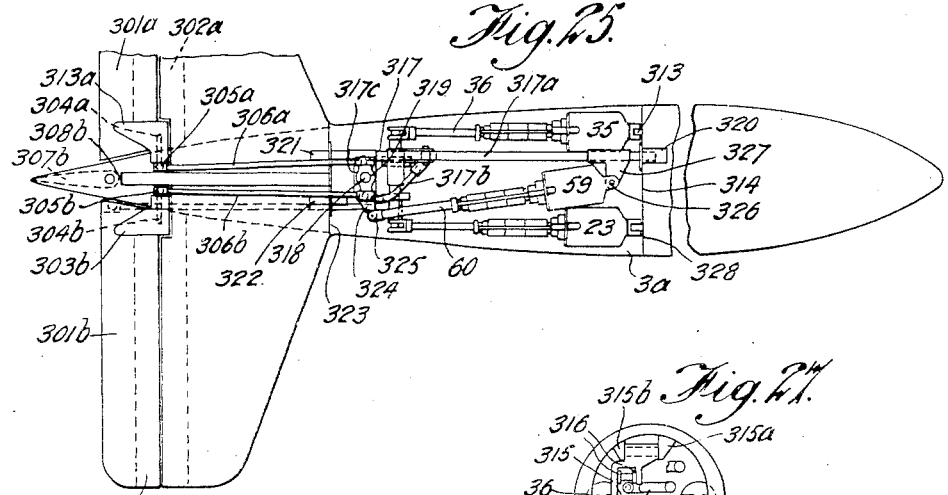
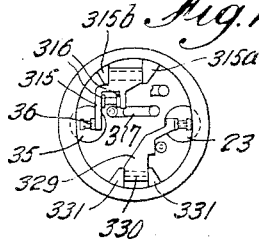
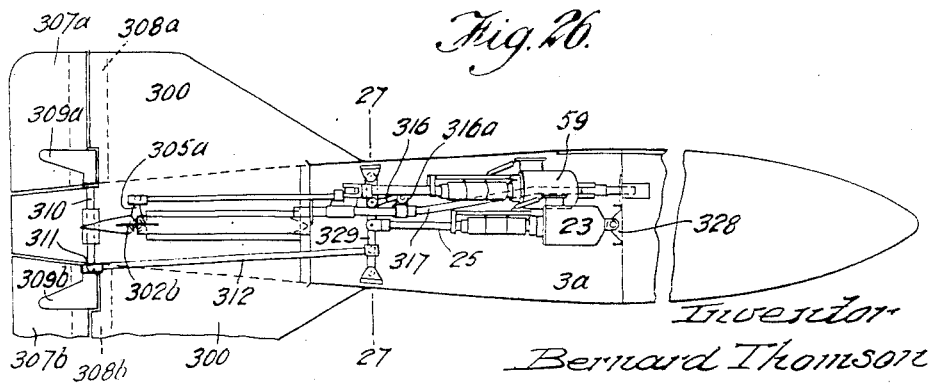

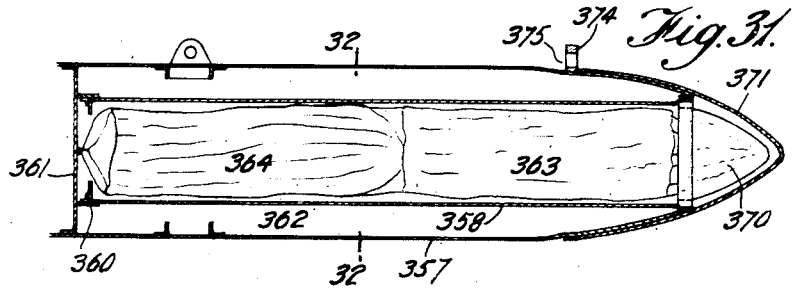
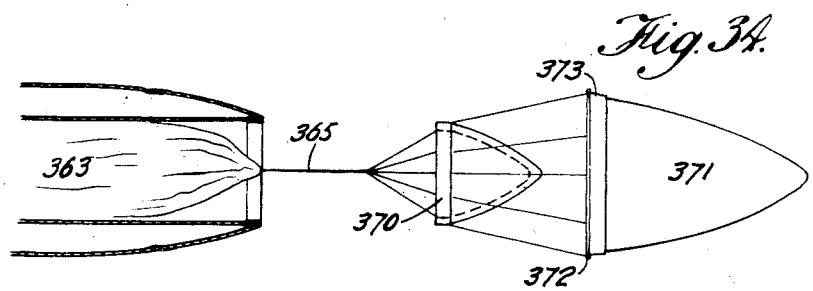
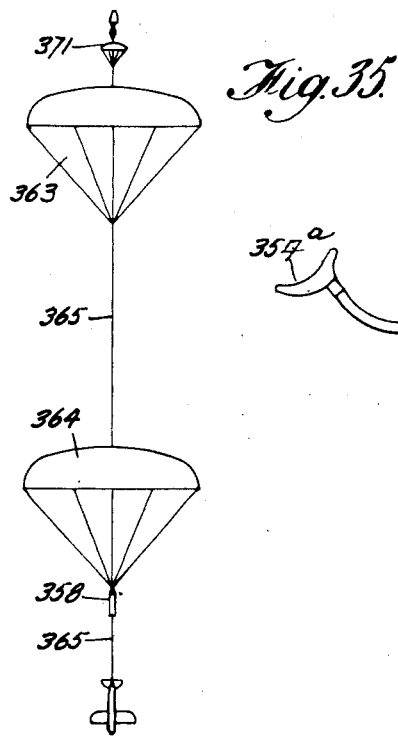
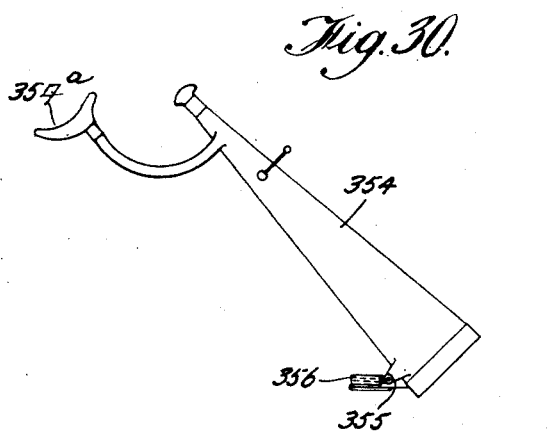

Patented May 7, 1946

2,399,954

UNITED STATES PATENT OFFICE 2,399,954

REMOTE-CONTROL SYSTEM

Bernard Thomson, London, England

Application June 18, 1941, Serial No. 398,679
In Great Britain May 2, 1940

17 Claims. (Cl. 244—77)

My invention relates to electric remote control systems, and is particularly applicable for directing the path of aerial bombs after being released from aircraft.

The object of my invention is to provide an improved electric remote control system.

My invention consists in the combination of parts set forth in the claims appended hereto.

Referring now to the accompanying drawings, which are more or less of a diagrammatic nature:

Figure 1 shows a plan of an aerial bomb constructed according to my invention.

Figure 2 shows a front elevation of the bomb illustrated in Figure 1.

Figure 3 shows a side elevation of the bomb illustrated in Figure 1.

Figure 7 shows an elevation, partly in section, illustrating the mechanism for lateral control of the bomb.

Figure 8 shows a front elevation of the lateral control mechanism.

Figure 9 shows a cross-section of the vanes for lateral control.

Figure 10 shows an elevation partly in section of a control jack.

Figure 11 shows a side elevation of the variable resistance coil incorporated with the control jack illustrated in Figure 10.

Figure 12 shows a cross-section on the line 12—12 in Figure 11.

Figure 13 shows a diagram of the electrical circuits for controlling the jack illustrated in Figure 10.

Figure 14 shows an elevation, partly in section, of the commutator mechanism for the bomb.

Figure 15 shows a cross-section of the commutator mechanism illustrated in Figure 14.

Figure 16 shows an end elevation of the commutator mechanism illustrated in Figure 14.

Figure 17 is a diagram of the electrical circuits for controlling the mechanism in the bomb.

Figure 18 shows a timing diagram of the signals distributed by the fast commutator in the bomb.

Figure 19 shows a diagrammatic illustration of the circuits in the aeroplane which controls the flight of the bomb.

Figure 20 is a front elevation, partly in section, of the commutator with its driving motor.

Figure 21 shows a cross-section through the line 21—21 in Figure 20.

Figure 22 shows a front elevation of the pilot's control spectacles with the control levers for the commutator brushes of the commutator illustrated in Figures 20 and 21.

Figure 23 is a plan of the mechanism illustrated in Figure 22.

Figure 24 is a diagram illustrating the transmission of signals.

Figure 25 shows a sectional plan of the bomb illustrating an alternative arrangement for its directional and lateral control.

Figure 26 shows a sectional elevation of the bomb showing the arrangement for its directional and lateral control.

Figure 27 shows a section on the line 27—27 in Figure 26.

Figure 30 shows an elevation of a bomb-laying telescope.

Figure 31 shows a section of the front part of a dummy bomb for practice purposes.

Figure 32 shows a section on the line 32—32 in Figure 31.

Figure 33 shows a detail of the grummet in Figure 31.

Figure 34 illustrates the manner in which the parachutes are withdrawn from the bomb illustrated in Figure 31.

Figure 35 illustrates the bomb in Figure 1 suspended from the parachutes.

Figure 4:
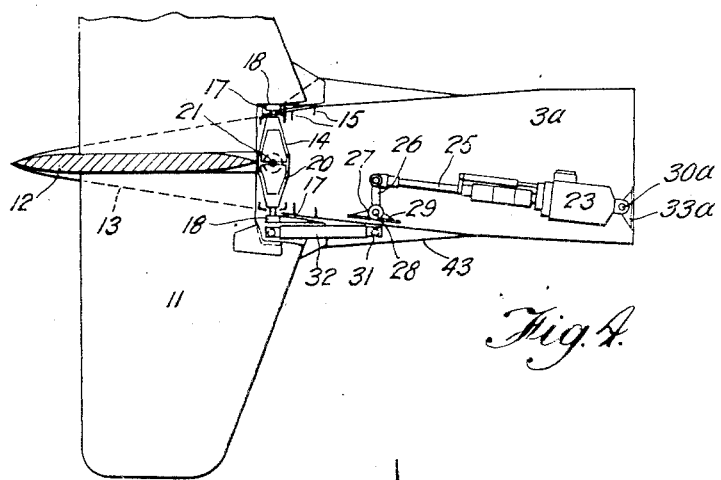
Figure 4 shows a sectional plan of the rear portion of the bomb illustrating the mechanism for controlling the tail unit for rudder action.

In carrying my invention into effect, according to one form and as applied by way of example to an arrangement for controlling the path of an aerial bomb after being launched from an aeroplane, the main features of such an arrangement are (1) the construction of the bomb in the form of a glider with supporting and control surfaces, the latter being controlled by wireless signals radiated from the aeroplane, (2) the provision of means such as differentially occulting lamps, for example, arranged in the wing tips of the bomb so that its position and trim are revealed either by night or by day to the person in the aeroplane controlling the bomb, and (3) the provision of synchronously running commutators in the aeroplane and in the bomb for the transmission and distribution of the signals.

The construction and mechanism of one example of aerial bomb will now be described.

The bomb is constructed as a small stable glider capable of travelling at very high speeds and under high loading conditions. One preferred form as illustrated in Figures 1, 2 and 3, is that of a low-wing monoplane bomb 1, as this form reduces the distance to the smallest possible extent that the bomb has to be displaced from the fuselage of the aeroplane directing its flight in order that when launched, the bomb will clear the airscrew of the aeroplane. The forward part 2 of the body of the bomb carries the explosive charge and firing mechanism therefor and is formed of steel or cast iron. The rear part 3 of the body of the bomb 1 is constructed as a monocoque fuselage, the stiffening, not shown, being attached to one side while the skin plating 4 on the other side is made detachable for obtaining access to the mechanism in the interior of the bomb.

The wing 5 of the bomb is fixed to the body and may be of solid or laminated timber or other dielectric material so as to avoid interference with the wireless radiations controlling the flight of the bomb. A receiving aerial 6 is arranged along the trailing edge 7 of the wing and a reflecting aerial 8 is arranged along the leading edge 9 of the wing.

Figure 6:
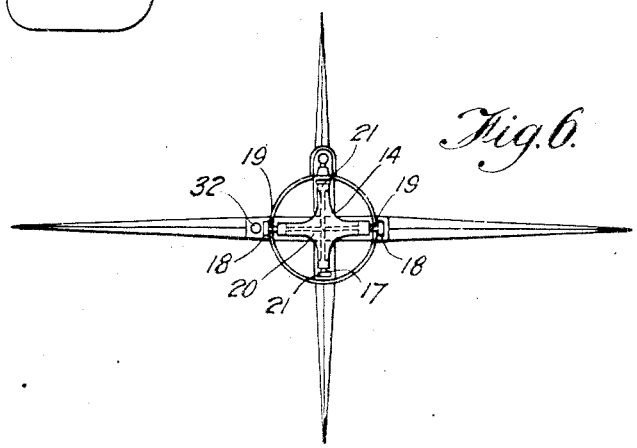
Figure 6 shows a cross-section on the line 6—6 in Figure 5.
Figure 5:
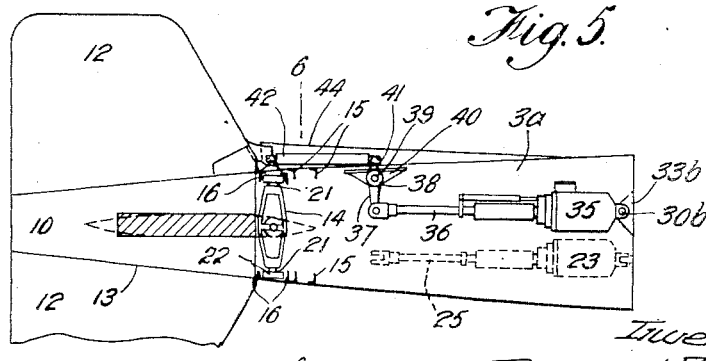
Figure 5 shows a sectional elevation of the rear part of the bomb illustrating the mechanism for controlling the tail unit for elevator action.

The bomb is provided with a tail unit 10, Figures 4, 5 and 6, comprising a tail plane 11 and fins 12 which are rigidly mounted on the extension 13 universally jointed to the rear part 3 of the bomb. The aerodynamic control surfaces of the unit, i. e., the surfaces of the tail plane 11 and fins 12 may be made of timber and the extension part 13 is made of sheet metal. The whole tail unit 10 may be rocked in the vertical plane so that the tail plane 11 acts to produce an elevator action, and this unit may also be rocked in the horizontal plane so that the fins 12 act to produce a rudder action. The control surfaces of the tail unit 10 are made of a shape such that when the bomb is travelling at velocities which approximate to that of sound, the effect of such velocities on the controls will be at a minimum.

An universal joint 14 of known form connects the extension 13 of the tail unit 10 to the body of the bomb as shown in Figures 4, 5 and 6. The rear end of the body of the bomb 1 is provided with two stiffening rings 15 and to these rings are attached two brackets 17 on which are mounted ball bearings 18 for the horizontal pivots 19 of the cross member 20 of the universal joint 14. The vertical pivots 21 of the cross member 20 are likewise mounted in ball bearings 22, Figures 5 and 6, which are similarly mounted in brackets, not shown, attached to the stiffening rings 16 arranged on the extension 13. The whole arrangement is similar to an ordinary Hooke's joint jointing two hollow shafts together, one shaft being the body 3 of the bomb and the other the extension 13 of the body. The extension 13 can thus be tilted up or down or rocked to right or left relative to the part 3.

The cross member 20, Figure 4, is rocked about its vertical pivots 21 for rudder action of the fins 12 of the tail unit 10, the rocking movement being effected by the rudder control jack 23 located in the rear compartment 3a of the bomb 1. The operating spindle 25 of the jack 23 is connected to an arm 26 of a two-armed lever 27. The lever 27 is pivoted on the pin 28 which is fixed to the bracket 29. The bracket 29 is suitably fixed in the compartment 3a. The other arm 31 of the lever 26 is connected by means of the link 32 to the starboard side of the tail plane 11. The rudder control jack 23 is pivotally mounted at its forward end on the pin 30a of the bracket 33a which is suitably fixed in the compartment 3a.

The cross member 20 may thus be rocked about its vertical pivots 21 in either direction by the operation of the rudder control jack 23 through its spindle 25, lever 27 and link 32.

The cross member 20 is rocked for elevator action of the tail plane 11 of the tail unit 10 by an elevator control jack 35, Figure 5, which like the control jack 23 is arranged in the rear compartment 3a of the bomb. The operating spindle 36 of the jack 35 is connected to the arm 37 of a two-armed lever 38 which is pivotally mounted on the pin 39 fixed to the bracket 40. The bracket 40 is suitably fixed in the compartment 3a. The second arm 41 of the lever 38 is connected by means of a link 42 to the fin 12 of the tail unit 10, Figure 6. The jack 35 is pivotally mounted at its forward end on the pin 30b fixed to a bracket 33b. The bracket 33b is suitably fixed in the compartment 3a of the bomb.

The tail unit 10 may thus be rocked to give elevator action by the operation of the jack 35 and independently or simultaneously to give rudder action by the operation of the jack 23.

Fairings 43 and 44 are provided for the links 32 and 42 respectively.

For effecting lateral control of the bomb, four vanes 45, 45a, 45b and 45c are arranged on the nose of the bomb and are spaced circumferentially apart at angles of 90 degrees in relation to one another. The section of the vanes is symmetrical, as shown in Figure 9, about their longitudinal axis. The vane 45 has a metal sleeve 47 fitted on, and rigidly secured to, its inner end. The sleeve 47 has a metal cross-member 48 rigidly secured therein, and in this member are formed two holes 49 and 50 which extend longitudinally of the sleeve. The hole 49 is co-axial with the geometrical axis of the section of the vane 45, while the hole 50 is parallel to and of smaller diameter than the hole 49. The hole 50 is arranged also on the centre line of the section 46. The vane 45 is rotatably mounted on a stud 51 rigidly fixed in the nose of the bomb and projecting into the hole 49 in the cross-member 48 in the sleeve 47. The vane 45 is secured against longitudinal displacement on the stud 51 by means of a split spring ring 52 which is sprung into corresponding grooves in the stud and in the hole 49 of the cross-member 48. The ring 52 is of similar construction to a piston ring.

In the hole 50 is freely mounted a pin 54, the outer end 55 of the pin being cranked. The cranked end 55 is free to rotate and to slide in a hole in the lug 56 of an adjusting ring 57 which is rotatably mounted in a groove 58 formed in the nose of the bomb.

From the above description it will be seen that by rotating the adjusting ring 57 in the clockwise direction viewed in the direction of the arrow shown in Figure 7, the vane is partially rotated on the stud 51 in the anti-clockwise direction, while if the ring 57 is rotated in the anti-clockwise direction, the vane 45 is rotated on the stud 51 in the clockwise direction.

The vanes 45a, 45b and 45c are of similar construction to the vane 45 and are connected to, and operated by, the adjusting ring 57 in the same manner as the vane 45.

The operation of the adjusting ring 57 is effected by the lateral control jack 59. The operating spindle 60 of the jack 59 is connected to the arm 61, Figure 8, of a two-armed lever 62, of which the second arm 63, Figure 7, carries a cranked pin 64 which is free to rotate and slide in a hole therein. The cranked arm of the pin 64 is similarly mounted in a hole in the lug 65 of the adjusting ring 57. The lever 62 is rotatably mounted on a pin 66 fixed to the nose of the bomb. The jack 59 is pivotally mounted at its rear end on a pin 67 fixed to the wing 5, and together with its associated parts is enclosed by a fairing 68.

By appropriate operation of the control jack 59, the adjusting ring 57 may be rotated and the four vanes 45, 45a, 45b and 45c may be rotated about their longitudinal axes so as to take up an inclined position in relation to the direction of flight of the bomb and thereby produce a rotational movement of the bomb about its longitudinal axis for correcting any tilt about this axis which may develop during the flight of the bomb. Also if the bomb rolls over and flies on its back, it may be returned to its correct position by operation of the vanes 45, 45a, 45b and 45c.

From a consideration of Figure 8 it will be seen that the eddy sheets of the aerodynamic control surfaces of the tail plane 11, fins 12 and vanes 45, 45a, 45b and 45c do not interfere with one another.

The construction and operation of the control jack 35, Figures 5 and 10, for elevator control will now be described, and as this jack is similar in construction and in operation to the control jacks 23 and 59, the following description of the jack 35 will render a description of the other two jacks unnecessary.

The operating spindle 36 hereinbefore described, of the jack 35, Figure 10, is provided at its right-hand end with a screw thread 70. The screw thread 70 engages with a rotatable nut 71 which is of annular section, and is closed at its right-hand end. Only the part 72 of the bore of the nut 71 is screw-threaded, the remaining part 73 being plain and of suitable diameter to provide clearance for the screw thread 70 when it projects therein. A circular extension 74 is formed on the closed end of the nut 71, the extension being integral and co-axial with the nut. On this extension 74 is formed a collar 75 and the extension is mounted in a roller thrust bearing 76 arranged between the collar 75 and a double-armed member 77 which forms part of a toothed epicyclic reduction gear.

The nut 71 is also rotatably mounted in a bearing member 78 which is attached by studs, not shown, to the casing 79 of an electric motor 80, a distance flange, internally toothed to form part of the epicyclic reduction gear, being inserted between the casing 79 and the flange 82 of the bearing member. The electric motor 80 is a D. C. multi-pole self-starting motor of any suitable type, and has the sun driving wheel 83 of the epicyclic gear rigidly attached to the left-hand end of its armature shaft 84. The wheel 83 engages with two planet wheels 85 which are carried on pins 85a and are disposed diametrically opposite to each other on the double-armed member 77 above described. On the pins 85a are also carried planet wheels 86 which are fixed to the planet wheels 85, and the planet wheels mesh with the driven sun wheel 87 which is rigidly mounted on the extension 74 of the nut 71 and with the internally toothed flange 81.

On the spindle 36 is fixed an arm 88 which carries a tube 89 fixed thereto. The tube 89 has two contact brushes 90a and 90b longitudinally spaced apart and fixed thereon. Within the tube 89 is arranged a supporting rod 91 on which the tube is slidable, one end of the rod being fixed in a boss 92 of the bearing member 78. The brushes 90a and 90b on the tube 89 are arranged to make contact with a variable resistance coil 93, Figure 11, which is mounted on a drum 94 formed of insulating material and rigidly fixed to the nut 71. The coil 93 is formed of three separate sections, viz., a central section 93a of low resistance wire and two end sections 93b and 93c of resistance wire. The three sections are of equal length and diameter and their helices are of the same pitch and hand as the screw thread 70 of the spindle 36. The adjusting ends of the coil sections 93a and 93b and of the coil sections 93a and 93c are bent inwards as illustrated in Figure 12 so as to leave insulated intermediate spaces 95a and 95b between the adjacent ends of the coil sections. The insulated intermediate spaces 95a and 95b form breaks between the sections which are of equal length and are symmetrically disposed about the same longitudinal plane through the axis of the coil 93. When the spindle 36 is in the position corresponding to the neutral position of the tail plane 11 of the tail unit 10, i. e., the position when the tail plane has no directive action on the bomb, the brush 90a is in contact with the insulated intermediate space 95a and the brush 90b is in contact with the insulated intermediate space 95b as shown in Figures 10 and 11. The brushes 90a and 90b when in this position are thus insulated from the coil sections 93a, 93b and 93c.

On the end of the drum 94 adjacent to the motor 80 two contact rings 96a and 96b, Figure 13 are arranged. A contact brush 97a fixed to the bearing member 78 and insulated therefrom, coacts with the ring 96a and a second contact brush 97b also fixed to the bearing member 78 and insulated therefrom, contacts with the ring 96b. The brush 97a is connected to the negative pole of a bias battery, hereinafter described, while the brush 97b is connected to the positive pole of this battery. A lead 96c, Figure 13, arranged in the drum 94 is connected at one end to the contact ring 96a and at its other end is connected to the central point in the length of the coil section 93a. Leads 96d and 96e also arranged in the drum 94, connect the outer ends of the coils 93b and 93c to the ring 96b. The coil sections 93b and 93c are thus of positive potential, and the coil section 93a of negative potential.

When the nut 71 is rotated by the electric motor 80 through the epicyclic gear before described, the drum 94 is rotated along with the nut, and as the brushes 90a and 90b move axially along with the spindle 36 of the control jack 35, these brushes follow and maintain constant contact with the two coil sections 93a and 93b, or 93b and 93c according to the direction in which the spindle 35 is moved from its neutral position by the rotation of the nut 71.

On the casing 79 of the motor 80 two electromagnetic control switches 98 and 99 are arranged, and these switches are energized one at a time, i. e., they cannot be energized simultaneously. The switch 98 controls circuits for the operation of the motor 80 in one direction when "down elevator" signals are received, while the switch 99 controls the circuits for operation of the motor 80 in the reverse direction when "up elevator" signals are received.

It is essential that each of the spindles 25, 36 and 60 of the control jacks 23, 35 and 59 should move through a distance proportional to the length of the individual incoming control signals received by the wireless set, hereinafter described, in the bomb from the aeroplane controlling its flight, and that when operated each control jack spindle remains in the displaced position so long as control signals of the same length or duration are being received by the control switches of its jack, and further that on stoppage of the control signals being received by the control switches of any particular jack, such jack should immediately return its spindle to its neutral position i. e., to the position of its spindle which corresponds to the neutral position of the tail plane 11, the fins 12 or the vanes 45, 45a, 45b, 45c as the case may be.

The electrical circuits for actuating the control jack 35 for elevator action, in order that it shall function to meet the requirements set forth above, will now be described.

The outer end of the coil section 93b is connected through the lead 96e, contact ring 96b, contact brush 97b, junction 102, lead 101 to the positive pole of the bias battery 100, while the outer end of the coil section 93c is connected to this pole through the lead 96d, contact ring 96b, brush 97b, junction 102 and lead 101. The centre point 105 of the coil section 93a is connected through the lead 96c, contact ring 96a, brush 97a and lead 106 to the negative pole of the bias battery 100.

The brush 90a is connected through the lead 107, junction 110 and lead 108 to a movable contact 109 of the control switch 98. From the junction 110 a connection leads to the movable contact 112 of the control switch 99, while a connection leads from the junction 110 to the lower armature brush 114 of the motor 80.

The brush 90b is connected by the lead 15, junction 118 and lead 116 to the upper armature brush 117 of the motor 80, while the junction 118 is also connected by the lead 119, junction 122 and lead 120 to the movable contact 121 of the control switch 96. The junction 122 of the leads 119 and 120 is connected by the lead 123 to the movable contact 124 of the control switch 99.

The solenoid 125 of the control switch 98 is connected at one end to a lead 126 from a fast commutator, hereinafter described, which distributes in the bomb circuits signals received from the aeroplane controlling the flight of the bomb, while the other end of the solenoid 125 is earthed through a fixed contact 127 common to the movable contacts 121 and 112 of both control switches 98 and 99. The solenoid 128 of the control switch 99 is connected at one end to a second lead 129 from the commutator above referred to, and at the other end this solenoid is connected to the common fixed contact 127.

A second fixed contact 130 common to the movable contacts 109 and 124 of both control switches 98 and 99 is connected by a lead 131 to the positive pole of a main battery hereinafter described. The solenoids 125 and 128 are provided with soft iron cores 132 and 133, the solenoid 125 when energized operating by means of its core 132 the two movable contacts 109 and 121, and the solenoid 128 when energized, operating by means of its core 133 the movable contacts 112 and 124.

The field coils 134 and 135 of the motor 80 are connected in circuit with the bias battery as follows. The field coil 134 is connected to the positive pole of the bias battery 100 through the lead 136, junction 102 and lead 101, while the field coil 135 is connected to the negative pole of the battery 100 by the lead 138. The field coils 134 and 135 are interconnected with each other by the lead 137.

The operation of the control jack 35 is as follows:

Let it be assumed that the spindle 36 of the control jack is in its neutral position, i. e., the position corresponding to the neutral position of the tail plane 11. In this position the brushes 90a and 90b contact with the intermediate insulated spaces 95a and 95b, Figure 11, of the coil 93 and all the circuits controlled by these brushes are closed.

As will be explained later, separate signals are transmitted by the fast commutator for "up elevator" and for "down elevator" control, and the circuits are so arranged that the lead 129 transmits the "up elevator" signals and the lead 126 the "down" elevator signals from the fast commutator to the control jack 35. The control switch 99 will thus be operated by the "up elevator" signals and the control switch 98 will be operated by the "down elevator" signals.

The signal currents transmitted by the leads 129 and 126 are of a pulsating character of which the individual pulsations are proportional to the magnitude of the control movement to be effected by them, as will be hereinafter explained, and the duration of the closed periods of these switches when operated by a signal will vary in accordance with the length of duration of the signals transmitted through the lead 129 or the lead 126. For example, if a signal for a small elevator control movement is transmitted the individual closed periods of the control switch 99 or of the control switch 98 will be small, while if a signal for a greater control movement is transmitted, these periods will be proportionately greater.

When, therefore, an "up elevator" signal is transmitted through the lead 129, the solenoid 128 is intermittently energized and the core thereof is rendered intermittently magnetic and operates the two movable contacts 112 and 124. The solenoid 125 and the core 132 of the contact switch 98 are not energized so that this switch remains open. The closures of the contact 124 cause current from the main battery to pass by way of the lead 131 and fixed contact 130, movable contact 124, lead 123, junction 122, lead 119, junction 118 and lead 116 to the upper armature brush 117, then through the armature of the motor 80 to the lower brush 114 and then through the lead 113, junction 110, lead 111, movable contact 112 to the fixed contact 127 and to earth, in this case the metal structure of the bomb. A continuous current thus passes from the positive pole of the bias battery 100 through the lead 101, junction 102, lead 136, field coil 134, lead 137, field coil 135 and lead 138 to the negative pole of the bias battery 100. Intermittent currents from the main battery will thus pass from the upper armature brush 117 to the lower armature brush 114 and cause the armature shaft to rotate, while the field coils 134 and 135 are energized by a continuous current from the bias battery 100. The armature shaft 84 rotates the nut 71 through the epicyclic gear 83, 85, 85a, 87 in the clockwise direction viewed from the left in Figure 10 and causes the spindle 36 to commence moving towards the left in this figure.

As the spindle 36 moves towards the left, it carries the arm 88 together with the tube 89 and brushes 90a and 90b along with it so that these brushes move off from the intermediate insulated spaces 95a and 95b, Figures 11 and 12, on the drum 94 and make contact with the coil section 93a and with the resistance wire of the coil section 93b of the coil 93. Current will then pass during the open intervals of the control switch 99 from the positive pole of the bias battery 100 through lead 101, junction 102, to the brush 97b and thence through the contact ring 96b to the coil section 93b and thereafter through the brush 90a, lead 107, junction 110, lead 113 to the lower armature brush 114. From this brush it passes through the armature to the upper armature brush 117, junction 118, lead 115 to the brush 90b. From the brush 90b the current passes through the coil section 93a and then by way of lead 96c and contact ring 96a to the negative pole of the bias battery 100 by way of brush 97a and lead 106. During the closed intervals of the control switch when a signal is being transmitted, current from the bias battery 100 will tend to pass through the above circuit in opposition to the current from the main battery, while during the open intervals it will be the only current passing through the armature of the motor 80.

The greater the distance the brushes 90a and 90b are moved from their neutral position, the less will be the resistance of the coil 93b associated with them and the greater will be the current passing from the bias battery 100 through this circuit.

Current impulses from the bias battery 100 thus pass or tend to pass through the armature of the motor 80 in the opposite direction to the pulsating currents which pass through the armature from the main battery. The armature of the motor 80 under these conditions rotates until these opposing currents balance, and the extent of its rotational movement is proportional to the length or duration of the individual signals transmitted and to the duration of the closed periods of the control switch 99 corresponding to the individual signals. The armature at the end of its movement will remain stationary or make slight oscillations so long as the same length of signals continue to be received. When these signals cease, the control switch 99 remains open and the armature is rotated by continuous current from the bias battery 100 through the circuit controlled by the brushes 90a and 90b above described, and in the reverse direction so that the spindle 36 and with it the brushes 90a and 90b are returned to the neutral position, in which these brushes again contact with the intermediate insulated spaces 95a and 95b on the drum 94 and thereby break the armature circuit controlled by the brushes 90a and 90b. The tail plane 11 of the tail unit 10 is returned by the spindle 36 into its neutral position.

The action of the jack 35 may be explained by considering that with a constant field current, the armature of an electric motor will rotate in a clockwise or anti-clockwise direction according to the direction of the current passing through it. If an ordinary A. C. current is passed through the armature under these conditions it simply oscillates very slightly. Suppose that the positive phases of the A. C. current are of greater power than the negative phases thereof, the armature will move say more in the clockwise than in the anti-clockwise direction at each oscillation of the current and will gradually creep in the clockwise direction. The additional power to the positive phases may be arranged by giving more positive than negative voltage to the phases or by making the duration of the positive phases longer than that of the negative phases. Both methods are used in the system above described. The control pulsations, i. e., those transmitted from the main battery through the lead 131 and the control switches 98 and 99 are of constant voltage but of variable duration. The bias or return pulsations, i. e., those from the bias battery 100 and controlled by the brushes 90a and 90b above described, are of variable duration and of variable voltage, the voltage of the bias pulsations increasing the farther the spindle 36 of the control jack 35 and the farther the brushes 90a and 90b move from their neutral positions. As the control and bias pulsations pass through the armature of the motor 80 alternately to each other in opposite direction they have a similar effect on the armature 80 as that of an alternating current with unequal phases as above described, which are gradually equalized, and on equalization being attained the armature remains stationary or oscillates slightly.

The motor 80 will accordingly rotate until the brushes 90a and 90b have made the rotational effect of the bias pulsations on the armature equal to that of the control pulsations. If the control pulsations are long so that the periods between them are short, then the control movement will be a long one for the brushes 90a and 90b will require to be moved along the coil sections of the coil 93 until the bias current voltage rises to a high value. It must be pointed out that the coil sections 93b and 93c are of resistance wires, while the coil section 93a is of large diameter wire offering negligible resistance. A slight movement, therefore, of the brushes 90a and 90b will leave a large amount of resistance wire of the coil sections 93b or 93c still in circuit, but a large movement will leave practically no resistance in the circuit controlled by the brushes 90b and 90c. Consequently for short pulsations only a small control movement results, since they are soon balanced by a small movement of the brushes 90a and 90b along the coil 93.

If the "up elevator" signal is gradually increased the spindle 36 is moved a farther distance to the left corresponding to the longer duration of closure of the control switch 99 before balance is again established between the effect of the main battery current and the bias battery current on the armature of the motor 80, while if the "up elevator" signal is gradually diminished, the spindle 36 is moved towards the right a distance corresponding to the reduction in length of the signal before balance is established between the action of the main and bias battery currents on the armature of the motor 80.

When "down elevator" signals are being transmitted, the solenoid 125 of the control switch 98 is energized while the solenoid 128 is cut out. The energization of the solenoid 125 causes the movable contact 121 to make contact with the fixed contact 127 and the movable contact 109 to make contact with the fixed contact 130. The currents passing through the lead 126 are of a pulsating character and consequently the solenoid 125 is likewise energized intermittently.

Current from the main battery passes along the lead 131 to the fixed contact 130 and then by way of the movable contact 109, lead 108, junction 110, lead 113 to the lower armature brush 114, thence through the armature of the motor 80 to the upper armature brush 117 and thereafter through the lead 116, junction 118, lead 119, junction 122, lead 120, movable contact 121, fixed contact 127 to earth.

The field coils 134 and 135 are energized by current from the bias battery 100 passing through the same circuit as that previously described with respect to the operation of the control switch 99.

The motor 80 thus starts and rotates the nut 71 through the epicyclic gear above described so that the nut 71 is rotated in the anti-clockwise direction as viewed from the left in Figure 10.

The spindle 36 consequently moves towards the right from its neutral position shown in Figure 10 so that the brush 90a moves on to the coil section 93a and the brush 90b moves on to the coil 93c. Current from the positive pole of the battery 100 passes or tends to pass to the upper armature brush 117 through the lead 101, junction 102, brush 97b, contact ring 96b, lead 96d, coil 93c, brush 90b, lead 115, junction 118, lead 116, upper armature brush 117, armature of motor 80, lower armature brush 114, lead 115, junction 110, lead 107, brush 90a, lead 96c, contact ring 96a, brush 97a and lead 108 to the positive pole of the bias battery 100.

Current from the bias battery therefore passes or tends to pass through the armature of the motor 80 in the above circuit in the opposite direction to that in which the current from the main battery flows therethrough, and the motor 80 moves the spindle 36 through a distance proportional to the length or duration of the incoming signals as above described with reference to "up elevator" signals. The return of the spindle 36 to the neutral position on cessation of the incoming signals and the movements when the length of the incoming signals are gradually increased or decreased are also similar to those above described for "up elevator" signals and will not be described further.

It will be evident from the above description that the combined rotation of the resistance coil 93 and the axial movement of the brushes 90a and 90b effect the stoppage of the current for the armature through these brushes at a definite point. The insulated intermediate spaces 95a and 95b only occupy a fraction of the circumference of the coil and are symmetrically disposed with reference to the same plane through the axis of the coil. The neutral point is thus not only fixed by the axial position of the brushes 90a and 90b but it only occurs at one angular point in the coil's rotation. Hence both the coil 93 and the nut 71 always return to the same lineal and rotational position, and the neutral point is consequently fixed within very fine limits.

The commutator mechanism for distributing in the bomb the signals received from the controlling aeroplane, and for controlling the flash lamps in the wing 5 is illustrated in Figures 14, 15 and 16. The commutator mechanism is arranged in a compartment 3b, Figure 3, in the bomb. The compartment 3b is situated directly ahead of the compartment 3a which houses the control jacks 23 and 35. The commutator mechanism is housed in a casing 141. In the casing 141 is arranged an electric motor 142 which is arranged to run at a constant speed of 1800 R. P. M. and this speed is maintained constant by means of impulses transmitted as hereinafter described, to the known synchronizing device 143, consisting of two coils 144a and 144b in series which are arranged to act on an additional armature 145 fixed to the lower end of the motor armature shaft 146. The armature 145 is arranged in a casing 147 formed as an extension of the casing 141. The armature 145 is arranged as a flywheel having considerable inertia so that in the event of momentary succession of signals it will keep the speed of the motor constant.

The armature shaft 146 of the motor 142 is disposed vertically and drives through spiral gearing 148b a cross shaft 149. The shaft 149 is rotatably mounted in bearings 150 arranged on the upper end of the motor casing. On the right-hand end of the shaft 149 is rigidly fixed a fast-running commutator 151. The commutator 151, Figure 15, is formed as an insulated disc having a single radial contact 152 inserted in it. With the centre 153a of the contact 152 a spring-mounted contact brush 153 is adapted to contact continuously. The brush 153 is mounted in, and insulated from, the cover 154. Nine other spring-mounted contact brushes 161 to 169 are also mounted in, and insulated from, the cover 154 and are arranged to make contact consecutively with the radial contact 152 as the latter rotates. The connections of the brushes 161 to 169 will be hereinafter described.

The gear ratio of the drive of the cross-shaft 149 is 3 to 1 so that the fast-running commutator 151 runs at a speed of 600 R. P. M.

On the shaft 149 is rigidly mounted a spur pinion 170 and this pinion meshes with a spur wheel 171 rotatably mounted on a stud 172 fixed to the casing of the motor 142. On the outer face of the wheel 171 is mounted a slow running commutator 173 which is suitably insulated from the wheel and rigidly attached thereto. The commutator 173 is formed of metal and has four cut-out portions 174 and also two radially deeper cut-out portions 175 which are filled with insulating material. The gear ratio of the wheels 170 and 171 is such that the slow-running commutator rotates at a speed of 75 R. P. M.

In the end cover plate 154 of the casing 141 there are mounted three additional spring-mounted contact brushes 176, 177 and 178, the brushes being insulated from the cover plate. The brush 176 contacts continuously with the commutator 173, the contact of the brush 177 with the commutator is interrupted by the two cut-out portions 175 at equal intervals twice in every revolution of the commutator, and the contact of the brush 178 with the commutator is interrupted at equal intervals six times in each revolution of the commutator. As hereinafter described, two lamps are arranged in the tips of the wing 5 and these lamps are connected with the brushes 176, 177 and 178 in the manner later set forth.

The upper end of the armature shaft 146 is coupled to a shaft 179 which is rotatably mounted in the bearing 180 formed in the projecting sleeve 141a of the casing 141. The end 179a of the shaft 179 is formed as one member of a self-releasing coupling and is disposed in the opening 181, Figures 1 and 3, in the external plating of the bomb. The shaft 179 when required, is coupled up and driven by a shaft in the controlling aeroplane in order that the motor 142 may be run up in synchronism with a similar motor in the aeroplane as hereinafter described, before the bomb is launched from the aeroplane.

The wireless installation for receiving signals from the controlling aeroplane and also the circuits for the fast running and slow running commutators above described, are illustrated in Figure 17.

The wireless receiving set is preferably of the three-valve super-regenerative short-wave type, but any suitable form may be used, the set being coupled to the receiving aerial 6, Figure 1, on the wing 5. The receiving set 184 is of known construction and will be understood by those skilled in the art without a detailed description thereof. The signals which modulate the carrier wave in the transmitting set in the aeroplane, hereinafter described, are separated from the carrier wave in the receiving set 184 and operate a solenoid 186 arranged in the out-put or low-frequency circuit as shown.

The solenoid 186 is provided with a core 188 which operates a movable contact 189. The contact 189 co-acts with a fixed contact 190 and on the reception of a signal from the controlling aeroplane, the solenoid is energized and current from the main battery MB passes along the lead 191, through the junction 192 and along the lead 191a to the junction 193, thence through the lead 194 and contacts 189 and 190 and lead 195 to the radial contact 152 before described of the fast-running commutator 151. The contact brushes 164 and 167 of the commutator 151 are connected by leads 196 and 197 to a common lead 198 from the contact brush 161. The lead 198 is connected to the coil 144a of the synchronizer 143, before described, the coil 144a being also connected to one end of the coil 144b of the synchronizer, and the other end of the coil 144b being earthed to the bomb.

The brush 162 transmits "port rudder" signals to the control jack 23 before described, by the lead 129r, while the brush 163 transmits "starboard rudder" signals to the control jack 23 through the lead 126r. The brush 165 transmits "positive" lateral control signals through the lead 129l to the control jack 59, while the brush 166 transmits "negative" lateral control signals to this jack through the lead 126l. The brush 168 transmits "up elevator" signals through the lead 129 and the brush 169 transmits "down elevator" signals through the lead 126 to the control jack 35.

The leads 129 and 126 and the parts associated with them have already been described, and it is to be understood that similar parts are associated with and correspondingly operated by currents passing through the leads 129r and 126r for the control jack 23, and through the leads 129l and 126l for the lateral control jack 59.

The bias battery 100 is connected by leads 136 and 138, 136r and 138r, and 136l and 138l for energizing the field coils of the motors for the jacks 35, 23 and 59. The circuit for the energization of the field coils for the motor 80 of the control jack 35 have already been described with reference to Figure 13, and the circuits for the energization of the field coils of the motors of the jacks 23 and 59 are arranged in a similar manner.

The commutator motor 142 is connected by the lead 199 and lead 131 to the positive pole of the main battery MB.

The tips of the wing 5, Figure 1, are formed with cut-out portions at 201 and 202 in which electric incandescent lamps 203 and 204 are arranged, the cut-out portions being covered with fairings 201a and 202a of transparent plastic material. The forward portions of the bulbs of the lamps 203 and 204 are silvered in order to reflect the light from the lamps in the astern direction. The port lamp 203 is arranged to have a quick flash and the starboard lamp 204 is arranged to have a slow flash in order that the airman controlling the flight of the bomb can ascertain the trim of the bomb, as well as observing its flight.

The differential flashing of the lamps is effected by the slow-running commutator 173 above described with reference to Figures 14, 15 and 16.

In Figure 17 the circuits controlling the lamps 203 and 204 are indicated, the commutator 171 for purposes of illustration being duplicated, the lower commutator 171a showing the slow flash contacts for the lamp 204. The commutator 171a makes two contacts per revolution, while the commutator 171b, which shows the quick flash contacts for the lamp 203, makes six contacts per revolution. The brush 176 is connected to one terminal of a time switch 207, the brush 177 is connected to one contact of the starboard lamp 204, and the brush 178 to one contact of the port lamp 203 by the leads 210 and 211. The other contacts of the lamps 203 and 204 are interconnected by the lead 212. The lead 212 is connected by the lead 213 to the negative pole of the main battery MB, and the second terminal of the time switch 207 is connected by way of the lead 131 above described to the positive pole of the main battery. The time switch 207 is of known type and is provided with a catch operated by a press button 214, Figure 3, which projects through a hole in the plating of the bomb at 215 as indicated in Figure 1. The button is pressed in by its contact with the body of the aeroplane when attaching the bomb thereto, and renders operative the catch so as to prevent operation of the clockwork. When the bomb is launched the catch is released by the springing-out of the button 214 so that the clockwork commences to operate and closes the switch after the desired interval has elapsed from the launching of the bomb. This is necessary, as otherwise the switching-on of the lamps before, or on release of the bomb would indicate the position of the controlling aeroplane.

The timing diagram of the fast-running commutator 151 is shown in Figure 18 and taken in conjunction with the foregoing description is self-explanatory.

The apparatus in the aeroplane for directing the flight of the bomb is illustrated diagrammatically in Figure 19, and comprises a short-wave wireless transmitting set 219, a commutator 220, Figures 19, 20 and 21, for controlling the modulation of the carrier wave, and a multi-vibrator 221 for regulating the speed of the motor 222 which drives the commutator 220.

The wave-length band for controlling the bomb in the present example may be between 2.5 and 3 metres, so that known types of transmitting sets may be used. A minimum width of wave band is necessary so as to prevent interference arising when several aircraft launching remote-controlled bombs are in the vicinity of one another.

The short-wave transmitting set 219 in the present example is of the known Lecher wire type, and has four modulator valves 223 and six transmitting valves 224 arranged in circuits as shown in Figure 19. The arrangement shown in Figure 19 is of known type and will be readily understood by those skilled in the art from the diagram, without a detailed description thereof.

The commutator 220 is of dice-box or waisted shape and has a slip-ring 225 at one end. The slip-ring 225 has a circumferentially continuous conducting part 227 and a second circumferentially extending part 228 provided with three contacts 229 projecting from the part 227 and arranged at angles of 120 degrees apart. The part 228 other than the contacts 229 is of insulating material. A spring-mounted brush 230 contacts with the part 227 of the slip-ring, and a second similar brush 231 contacts with the contacts 229 of the part 228 one after the other as the commutator 220 rotates. The brush 230 is slidably mounted in a sleeve 230a of insulating material and the brush 231 is also slidably mounted in a sleeve 231a of insulating material. The waisted part 232 of the commutator 220 has two contact segments 234 and 234a of approximately triangular shape, the points of the segments facing each other as shown in Figure 20, but spaced apart so as to provide an insulated space 235 at the centre of the waisted part.

The spindle 236 of the commutator 220 is rotatably mounted at its right-hand end in a ball bearing 237 which is housed in the cover plate 238 of the casing 239 of the commutator, and at its other end it is also mounted in ball bearings, not shown, and is driven by the shaft 240 of the motor 222 through epicyclic reduction gearing 240a so that the speed of the commutator is one third of the speed of the motor 222.

Three brush holders 241, 242 and 243 are arranged at angles of 120 degrees apart and are rigidly mounted on pins 244, 245 and 246 which are pivotally mounted in bearings 247, 248 and 249 in the casing 239. A spring-mounted brush 250 suitably insulated from the holder 244 is mounted in this holder. Brushes 251 and 252 are similarly mounted in the brush holders 242 and 243. To one end of the pivot pin 244 an operating lever 253 is rigidly attached, and operating levers 254 and 255 are similarly attached to the pins 245 and 246.

When one of the brush holders 241, 242 or 243 is swung by means of its operating lever 253, 254 or 255, the operating face of the associated brush 250, 251 or 252 is swung in an arc corresponding to the curve of the waisted part 232 of the commutator 220 so that the brush maintains contact during the whole movement with the commutator. When one of the holders 241, 242 or 243 is in its central position, the brush associated with the holder in this position makes contact with the central neutral annulus extending through the gap between the points of the two segments 234 and 234a, and consequently does not pick up any current, as the whole of the waisted part of the commutator 220 with the exception of the two triangular segments 234 and 234a is of insulating material. The contact segments 234 and 234a are arranged in relation to the contact 229 as shown in Figure 20 and the segments 234 and 234a are in electrical connection with the slip-ring part 227.

When one of the brush holders 241, 242 or 243 with its associated brush 250, 251 or 252 is swung from its central position to the left as shown in Figure 20, its brush will pick up current from the segment 234a for a period which progressively increases the farther the brush is moved from its central position, owing to the shape of the segment, and when the holder is swung from its central position to the right, it will pick up current from the segment 234 but at an earlier period in the commutator's revolution.

The three contacts 229 as stated are arranged at angular distances of 120 degrees apart, and the two contact segments 234 and 234a are disposed as shown in Figure 20 between two consecutive contacts of the three contacts 229. The brush 250 is arranged diametrically opposite to the brush 231. As the commutator makes one revolution the brush 231 is wiped at three equal intervals during the revolution by the contacts 229. During one of the intervals the contact segments move past the brush 250, during the next interval they move past the brush 251 and during the third interval they move past the brush 252.

The brush 250 is used to transmit signals which cause the operation of the tail unit 10 for rudder action, the brush 251 is used to transmit signals which cause the operation of the vanes 45, 45a, 45b and 45c for lateral control, and the brush 252 is used for operation of the tail unit for elevator action of the tail unit 10.

The brush 250 when in contact with the segment 234 transmits "port rudder" signals, and "starboard rudder" signals when in contact with the segment 234a. The brush 251 when in contact with the segment 234 transmits "negative" lateral control signals, and "positive" lateral control signals when in contact with the segment 234a. The brush 252 when in contact with the segment 234 transmits "up elevator" signals, and when in contact with the segment 234a transmits "down elevator" signals.

The brush 231 transmits the synchronizing signals for maintaining the speed and phase relation of the motor 142 identical with those of the motor 222, and this brush and its co-acting contacts are arranged so that the timing diagram of the commutator 220 is the same as that of the fast commutator 151 on the bomb.

By "port rudder" signals are intended signals which cause control movements of the tail unit for rudder action in either direction between the neutral and hard-a-port positions of this unit, and by "starboard rudder" signals such which cause control movements in either direction between the neutral and hard-a-starboard positions.

Similarly by "negative" lateral control signals are intended signals causing control movements in either direction of the vanes 45, 45a, 45b, 45c between their neutral positions and their extreme positions in the negative direction, and by "positive" lateral control signals such which cause control movements in either direction between the neutral and extreme positive positions of those vanes.

Again, by "up elevator" signals are intended such signals causing control movements of the tail unit 10 for elevator action in either direction between the neutral and hard-up elevator action positions, and by "down elevator" signals those causing control movements in either direction between the neutral and hard-down elevator action positions of the tail unit 10.

The three levers 253, 254 and 255 may be operated independently of one another, so that for example, when one brush is not picking up any current, the second may be picking up current for the maximum length of time, while the third may be picking up current for the minimum length of time.

The levers 253, 254 and 255 for the brushes 250, 251 and 252 are arranged to be operated through suitable mechanisms either by the pilot or by an observer in the aeroplane controlling the flight of the bomb. The operating mechanism for these levers may consist, for example, of an ordinary control column and rudder bar, not shown, connected by means of Bowden cables to the levers 253, 254 and 255. The levers 253, 254 and 255 may also be operated through Bowden cables by control levers arranged on the control wheel or spectacles, and in Figures 22 and 23 such an arrangement of control levers is shown. In these figures two control levers 281 and 282 are mounted on the control wheel or spectacles 283. The lever 282 has a double movement, one movement being about the axis of the pin 284 and the second movement being about the axis of the pin 285. The lever 282 is adapted to actuate the levers 281 and 282 and the lever 281 to actuate the lever 256.

The commutator 220 is connected in circuit with the main battery 262, Figure 19, of the transmitting set, a variable resistance 263, a low frequency oscillator valve 264, a resistance 265 and a winding 266 of a low-frequency transformer 267, the other winding of which is connected in the circuit of the modulating valves 223 as shown. The commutator is connected in this circuit by the lead 261 which is connected to the brush 230 contacting with the slip-ring 227, while the brushes 231, 250, 251 and 252 are connected by the common lead 260 to the winding 267.

The speed of the motor 222 which drives the commutator 220 is governed so as to run at constant speed by the multivibrator 221, Figure 19. The multi-vibrator 221 is connected in circuit with the main battery 262 and a winding 271 of a transformer 272 as shown. The other winding 273 of the transformer 272 is connected in circuit with the solenoid 274. The solenoid 274 is provided with a soft-iron core 275, and with this core is associated a movable contact 276 which is connected to the positive pole of the main battery 262. The movable contact 276 coacts with a fixed contact 277 which is connected to the coils of electro-magnets 278 and 279 of a synchronizer. The electro-magnets 278 and 279 act on the eight-pole armature 280 of the synchronizer which is attached to the armature shaft 240 of the motor 222 driving the commutator 220.

Impulses from the multi-vibrator 221 are transmitted through the transformer 272 and act upon the solenoid 275. The contact 276 is accordingly vibrated and impulses from the main battery are transmitted to the electro-magnets 278 and 279 and regulate the speed of the motor 222 which drives the commutator 220 so that the motor runs at a constant speed of 600 R. P. M.

The shaft 240 of the motor 220 is provided with a shaft drive 290, Figure 20, which will be later described. By means of this shaft 290 the motor shaft 240 may be coupled up in correct phase relation to the shaft 146 of the commutator 142 which drives the fast-running commutator 151 in the bomb, so that the commutators may be run up to 6000 R. P. M. in synchronism before the bomb is launched. After release from the aeroplane, the commutator 220 and the commutator 151 are maintained in phase and at constant speed by synchronizing signals transmitted from the aeroplane as hereinafter described.

The commutator 220 when in operation closes circuits through the various brushes and transmits low-frequency oscillations to the winding 266 of the transformer 267, which in known manner are superimposed on the carrier wave radiated from the transmitting set 219 and modulates the carrier wave. The modulated carrier wave thus radiated is picked up by the receiving set 184, Figure 17, in the bomb and the modulations separated out from the carrier wave. The set of modulations transmitted by a single wiping operation of a contact by a brush constitutes a signal. The synchronizing signals are thus of the same length, and the directional and lateral control signals are of variable length depending upon the magnitude of the control movement desired.

The signals transmitted on wiping of the contacts 229 by the brush 231 are used for synchronization of the motors 222 and 142 driving the commutators 220 and 151. As the wiping operation occurs three times in each revolution of the commutator 220 three signals are transmitted in each revolution of the commutator. These signals are transmitted as low-frequency oscillations from the valve 264 which pass to the transformer 267, Figure 19, by way of lead 261, brush 251 and lead 260. The signals are then transmitted to the modulating valve circuit by the winding 268 of the transformer 267 and are radiated as modulations of the carrier wave by the transmitting set.

The synchronizing signals radiated from the aeroplane transmitting set 219 as modulations of the carrier wave are picked up by the wireless receiving set 184 in the bomb, Figure 17, and actuate the solenoid 186 as before described, so that in each revolution of the commutator 151 three sets of impulses corresponding to the separated out signal modulations of the carrier wave pass from the main battery MB by way of the contacts 189, 190 and lead 195 to the contact 153 of the commutator 151. The signals are distributed by the commutator 151 to the brushes 161, 164 and 167 in turn and from thence by way of the common lead 198 to the synchronizer 143, 144a, 144b.

If, for example, an "up elevator" signal is to be transmitted, the control lever 282 on the control wheel 283 is operated and by way of its Bowden cable connection correspondingly operates the lever 255. The lever 255 moves the holder 243 and with it the brush 252 to the right, Figure 20, so that the brush contacts with the segment 234. Low-frequency oscillations from the valve 264 are thus transmitted through the lead 261, brush 230, slip-ring 225, segment 234, brush 252, lead 260 to the transformer 267 and then to the modulator valve circuit and radiated from the transmitting set 219. The signal which is radiated corresponds to the duration of the contact between the brush 252 and the segment 234, and is transmitted as a set of modulated carrier waves which is picked up by the receiving set 184 in the bomb where the modulations forming the signal are separated out and actuate the solenoid 186. This causes the movable contact 189 to transmit the signal as a corresponding series of impulses from the main battery MB through the lead 195 to the contact 153 of the commutator 151. As the contact 153 has a circumferential length, which is less than the distance between adjacent brushes, and as the commutator 151 is running in synchronism with the commutator 220, the contact 153 at the moment of reception of the signal has left the brush 167 and just contacted with the brush 168. The brush 168 transmits the signal through the lead 129 to the control jack 35 which operates the tail unit 10 through the spindle 36 and its associated mechanism before described, so as to give an "up elevator" movement of the tail unit 10, the magnitude of which is proportional to the length of the transmitted signal or to the duration thereof.

If the control lever 282 is operated to give a "down elevator" control signal, the brush 252 is moved to the left in Figure 20 so that the brush 252 contacts with the segment 234a. The signal is transmitted so that when it arrives at the commutator 151 it will be at a later point in its revolution than the former signal. The transmission of the signal is effected in a similar manner to the previous signal and it is distributed by the contact 153 of the commutator 151 to the brush 169. The brush 169 transmits the signal to the control jack 35 which is then operated in the opposite direction to that by the previous signal. The spindle 36 transmits a control movement to the tail unit 10 which is proportional to the length or duration of the transmited signal.

Similarly for rudder action the control lever 281, is operated and causes the brush 250 of the commutator 220 to make contact with the appropriate segment 234 or 234a according to the rudder action required. In the case of "port rudder" signals the contact 153 wipes the brush 162 and for "starboard rudder" signals wipes the brush 163. The brushes 162 and 163 co-act with the jack 23 which operates the tail unit 10 for rudder action as before explained.

For "positive" lateral control signals, the control lever 282 is again operated and causes the brush 251 to make contact with the appropriate segment 234 or 234a according to the control action required. The brushes in the commutator 151 which are operative are the brushes 165 and 166 and these brushes control the operation of the control jack 59 in accordance with the signals transmitted.

In the bomb above described, the wireless receiving set 184 is arranged in the compartment 3c, Figures 1 and 3, and the main, bias and W/T batteries are arranged in the compartment 3d. The wireless set 184 may preferably be arranged on one of the bulkheads of its compartment 3c, the bulkhead being made removable. The main battery should be capable of supplying current say, of 2.5 amps. at 240 volts for some minutes.

From the above description it will be seen that by running the commutators 220 and 151 in synchronism with each other so that the phases of the timing diagrams are coincident, and by maintaining synchronism during the whole flight of the bomb by the synchronizing impulses which are applied to the motor 142 thirty times per second, signals which are transmitted in any phase or phases in the timing diagram of the commutator 220 are simultaneously received in the same phase or phases in that of the commutator 151 and distributed by it to operate the appropriate mechanisms for actuation of the controls in accordance with the signal or signals received. The bomb may thus be effectively controlled during the whole of its flight.

It will be understood that when a control signal is transmitted by the commutator 220, the signal will be repeated once in each revolution of the commutator until the operative brush is moved back to its neutral position, and that on the reception of each signal by the receiving set 184 the solenoid 186 operates the movable contact 189 so that it makes a single contact with the fixed contact 190, the duration of the contact corresponding to the duration of the signal.

In Figure 24 is illustrated a diagram of incoming signals which have been separated out in the receiving set 184 and being distributed by the commutator 151. The diagram is divided into four equal intervals r each of which represent one revolution of the commutator 151. The signals indicated by a represent the synchronizing signals, while those indicated by b are slight "port rudder" signals which are repeated 10 times per second. The signals indicated by c represent elevator action signals which progressively increase to the "hard up" signal.

The arrangements for effecting rudder action and elevator action of the tail unit 10 and for effecting lateral control by the vanes 45, 45a, 45b and 45c while illustrating the preferred arrangement may, however, be replaced by any other suitable arrangements of aerodynamic control, and in Figures 25, 26 and 27 I have shown an alternative arrangement for effecting rudder, elevator and lateral control of the bomb.

In these figures, the universal joint 14 and the vanes 45, 45a, 45b and 45c have been dispensed with, and the tail plane 11 and fins 300 are rigidly fixed to the tail of the body of the bomb. On the tail plane 11 elevator flaps 301a and 301b are hinged by means of leather strips 302a and 302b. On the inner ends of the elevator flaps 301a and 301b are attached parts 313a and 303b, and in these parts spindles 304a and 304b are rigidly fixed, the axis of these spindles being coincident with the hinge axis of the associated flap. To these spindles 304a and 304b are rigidly fixed arms 305a and 305b, the arms being connected to the operating rods 306a and 306b.

The rudder 307 is formed in two parts 307a and 307b as shown, which are hinged to the fins 300 by leather strips 308a and 308b, the rudder parts being provided with parts 309a and 309b rigidly secured to a common spindle 310. To the spindle 310 is rigidly attached an arm 311 to which is pivoted the operating rod 312.

The flaps 301a and 301b of the elevator are arranged to be operated in unison for elevator control and to be simultaneously and differentially operated for lateral control by the operating rods 306a and 306b. The manner in which the elevator flaps 301a and 301b and the rudder 307 are operated will now be described.

In the chamber 3a of the bomb are arranged control jacks 23, 35 and 59 respectively for rudder, elevator and lateral control. These jacks are all of the same construction as hereinbefore described with reference to Figures 10 to 13, and are connected to the fast commutator 151 also in the same manner as the previous arrangement. The jack 35 is pivotally mounted on an eye 313 on the bulkhead 314 of the compartment 3a and its spindle 36 is connected to the rocking member 315 which is mounted in bearings 315a and which is connected to the links 316. The links 316 are also connected to the lug 316a of a frame 317, Figure 27.

The frame 317 consists of a long bent tubular member 317a, a short bent tubular member 317b and a cross member 317c rigidly connected to the members 317a and 317b. The cross-member 317c carries a pivot pin 318 on which the rocking beam 319 is pivotally mounted, and to this rocking beam are attached the inner ends of the operating rods 306a and 306b. The frame 317a is slidably mounted in the bearing 320 in the bulkhead 314 and in bearings 321 and 322 in the bulkhead 323.

The rocking beam 319 has a bent extension 324 and to this extension the spindle 60 of the lateral control jack 59 is connected by a pin 325. The jack 59 is pivotally connected by means of a pin 326 to the bracket 327 which is fixed to the member 317a of the frame 317.

The rudder control jack 23 is pivotally connected by means of a pin to the eye 328 attached to the bulkhead 314, while its spindle 25 is pivotally connected to a link 329 pivotally mounted by means of the pin 330 on the bracket 331. The bracket 331 is suitably fixed in the compartment 3a. The operating rod 312 of the rudder 307 is connected to an intermediate point of the link 329.

When the elevator jack 35 is operated either for upward or downward movements of the flaps 301a and 301b in unison, the spindle 36 of the jack is correspondingly moved, and displaces the frame 317 either forwards or backwards accordingly. The movement of the frame 317 carries the jack 59 along with it and as a result both of the operating rods 306a and 306b are moved bodily in unison and the elevator flaps 301a and 301b move upwards or downwards together.

When the lateral control jack 59 is operated, however, its spindle 60 rocks the beam 319 through its extension 324 in a direction corresponding to the direction of movement of the spindle 36, so that the flap 301a is moved upwards and the flap 301b simultaneously moved downwards through equal angular distances or vice versa according to the movement of the beam 319 being in a clockwise or anti-clockwise direction.

When the rudder jack 23 is operated, its spindle 25 moves the rudder 307 through the link 329 and the operating rod 312 in a direction and to an extent corresponding to the movement of the jack spindle.

Figure 28:
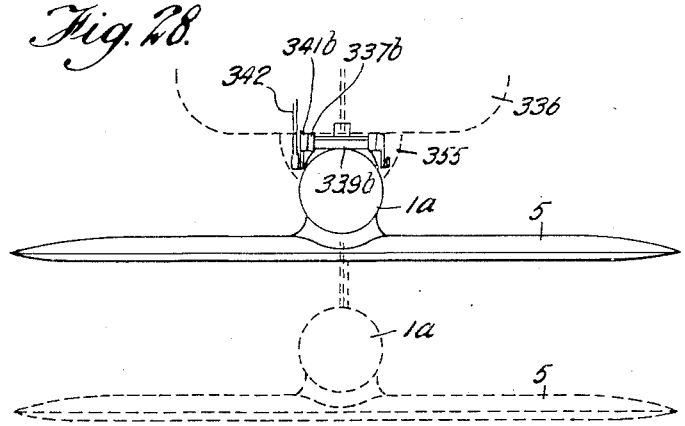
Figures 28 and 29 show a front and side elevation of the mechanism for launching the bomb.
Figure 29:
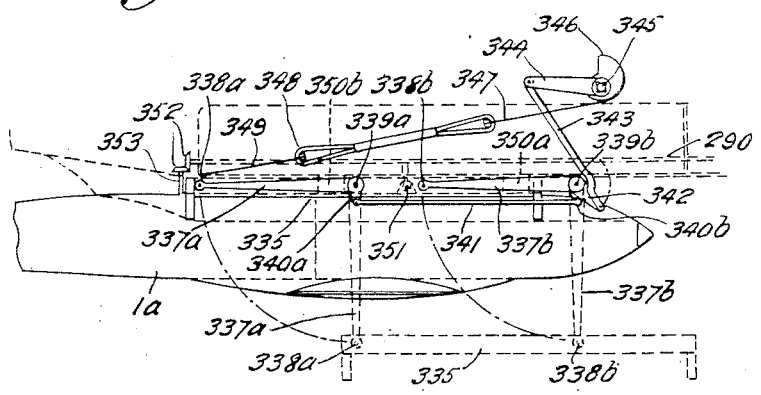

In Figures 28 and 29 is shown the bomb launching gear on the controlling aeroplane. The gear is illustrated in conjunction with a bomb as shown in Figures 26, 27 and 28, but it is obvious that with slight alterations in the details it may also be used for a bomb as illustrated in Figures 1–3.

The bomb 1a is held against a cradle 335 which is disposed on the underside of the fuselage 336 so that the bomb is as close as possible to the fuselage. The cradle 335 is shaped to conform to the curvature of the upper part of the bomb 1a and is connected to the fuselage 336 by two similar pairs of links, one pair being arranged on each side of the cradle. Only one pair of links are shown, viz., 337a and 337b and these links are connected at one of their ends to the cradle 335 by the pins 338a and 338b, and at their other ends are rigidly secured to shafts 339a and 339b which extend transversely on the fuselage 336, Figure 28. On the starboard end of the shafts 339a and 339b are rigidly mounted arms 340a and 340b, and to the free ends of these is attached a connecting rod 341.

The pair of links on the port side of the fuselage are similarly connected to the cradle 335 and to the shafts 339a and 339b, and the port ends of these shafts are provided with arms similar to the arms 340a and 340b and connecting rod similar to the rod 341. On the outer starboard end of the shaft 339a is mounted a second arm 342 and this arm is connected by a link 343 to an arm 344 rigidly mounted on a shaft 345. The shaft 345 is rotatably mounted in bearings, not shown, and carries a snail 346 centrally fixed thereon. To the snail 346 is attached one end of a cable 347, the other end of which is attached to one end of multiple elastic loops 348. The other end of the loops are connected to one end of a cable 349 and this cable at its other end is fixed to the fuselage 336. The elastic loops are under tension. Two electro-magnets 350a and 350b capable of exerting a pull of 50–60 lbs. each, are fixed to the cradle 335, the electro-magnets being connected in circuit with a battery or other source of direct current in the aeroplane, and also provided with an automatic switch which opens the circuit automatically when the cradle reaches its lowest position. The usual spring clips, not shown, are provided for holding the bomb in position on the aeroplane, and a catch 351 is provided for engaging with the slinging lug on the bomb. When the bomb has been released by the catch 351 and is moving out of the clips, the pull of the electro-magnets 350a and 350b on the bomb is then the only means which hold the bomb on the cradle 335.

The operation of the launching gear above described is as follows:

Before the bomb 1a is launched, it is essential that it should be in a position such that when launched it will clear the airscrews of the aeroplane controlling its flight. In the present gear, the bomb with the cradles 335 has to be moved from the position indicated in full lines in Figure 28 into that indicated by the broken lines on that figure. Before the catch 351 is released, the current is switched on to the electro-magnets 350a and 350b which thereupon act on the bomb and hold it against the cradle 335. After the catch 351 has been released the bomb is free to move out of its retaining clips under the action of gravity, while the elastic loops 348 acting on the cradle 335 through the snail 346, shaft 345, arm 344, link 343, arm 342, shaft 339b, link 337b, arm 340b, rod 341, arm 340a, shaft 339a and link 337a, and the attraction of the magnets 350a and 350b causes the cradle to follow the bomb down to the lowest position of the cradle, and if the bomb tries to move ahead too rapidly, to push it downwards clear of the airscrew path to the position indicated by broken lines in Figure 28. When this position is reached, the circuit controlling the supply of current to the electro-magnets 350a and 350b is automatically opened, and the bomb is then free and clear of the path of the airscrew. In the lowest position of the cradle 335 the link 343 has just passed through its upper dead point so that after the bomb has been dropped, the tension of the elastic loops 348 acting through the parts set forth above, returns the cradle 335 smartly into its initial position.

In Figure 29, the shaft 290, before described with reference to Figure 21, which is connected to the armature shaft 248 of the motor 222 driving the commutator 220 in the aeroplane, is connected through bevel gearing 352 with the shaft 353. The free end of the shaft 353 is formed as a self-releasing coupling member, and when the bomb is in position on the aeroplane, this coupling member engages with the co-acting self-releasing coupling member 179a of the shaft 179 which is driven by the armature shaft 146 of the motor 142 driving the fast commutator 151 on the bomb. By coupling up the shafts 353 and 179 in the correct phase relation, both commutators may be run up to their constant speed, viz., 600 R. P. M. in synchronism.

The operation in an attack with the bomb above described may be conducted as follows:

The attack is assumed to start at a considerable height and to be made by a machine in which the control of the bomb is performed by the pilot. Before the raid starts, the bomb is mounted under the aeroplane with the shaft 146 of the commutator motor 142 in the bomb coupled up to the shaft 290 connected to the commutator motor 222 in the aeroplane as above described. The coupling operation is effected with the commutators 151 and 220 in correct phase, whereby on starting up either motor, both commutators will be run up to speed in synchronism.

When the aeroplane is close to its target, the aeroplane and bomb motors 222 and 142 are started and the multi-vibrator 221 is set into operation so that both motors are run up to their constant speed in synchronism. About 20 to 30 seconds before the attack is made, the wireless transmission set 219 is started so that transmission from the aeroplane takes place. When the bomb is dropped, the drive connection between the shafts 353 and 179 is automatically disengaged. The clockwork time switch 207 in the flash lamp circuit starts up and after 10 seconds switches on the wing lamps 203 and 204 so that the bomb may be observed by the pilot of the aeroplane directing its flight. As the bomb moves forward and falls, it enters the field of the radiations from the aeroplane transmitting set 219 and thus comes under the control of the pilot. The pilot manœuvres his machine to get astern of the bomb. The slow and quick flash lamps 203 and 204 on the wing of the bomb, renders the bomb readily distinguishable, and the steering wheel control levers 281 and 282 enable the pilot while flying his machine to dive tandem with the bomb ahead of him along the sight line and to direct the path of the bomb until it hits the target.

In some cases, when a second man is employed to aim the bomb, a telescopic sight may be used. This sight consists of a high illumination night telescope 354, Figure 30, of three diameters magnification, the telescope at its lower end being mounted on an universal joint 355 carried on a rubber pad 356 and provided with a shoulder piece 354a for aiming purposes. The bomb control handles 281 and 282, before described, may be arranged one on each side of the body of the telescope 354 so that the whole forms a convenient and serviceable unit for the bomb layer to operate.

Alternatively, visual magnification for the pilot or bomb layer may be provided by equipping the pilot or bomb layer with goggles having one eyepiece of plane glass and the other formed as a magnification eyepiece with a small magnification as in a certain type of spectacles used in sport.

For practice purposes, a dummy bomb may be provided in which the chamber for explosive in the bombs hereinbefore described may be dispensed with and in its place a metal casing 357, Figures 31 to 35, may be provided. A canister 358 is slid within the casing 357. The canister 358 fits into a socket 360 on the forward bulkhead 361 of the battery compartment of the bomb, an annular space 362 being left between the canister and the casing 357. The space 362 forms a ballast chamber and is filled with lead shot. Two parachutes 363 and 364 are stored within the canister 358, the main lift wire 365 of the parachutes being led out at the rear of the canister, then forward through the ballast space 362 in a groove 366 in the canister, and then outside the casing 357 and into a groove 367 formed externally on the bomb and extending to the tail. The groove 367 may be covered with adhesive paper strip 368. The canister 358 is held in place by shearing pins and closed at its front end by a nose piece 370. An oil silk parachute 371 having a wire stiffening ring 372 at the bottom, covers the nose of the bomb and has a frill 373 over which is placed a rubber breaking grummet 374, Figure 33. The grummet 374 is attached to the cradle 335 before described, by the eye 375 and is formed with a reinforcement of fabric except at the part 376.

The method of practice is as follows:

The bomb is mounted below the aeroplane in the same manner as illustrated in Figures 28 and 29, with the breaking grummet 374 attached to the cradle 335. On release of the bomb the grummet 374 is broken by the weight of the bomb, its purpose being merely to keep the cap parachute in position while the bomb is attached to the aeroplane. The pressure of the air keeps the cap parachute in position on the bomb during the fall of the latter.

After release, the bomb is aimed at some target and allowed to fall within 3000 to 4000 feet of the ground. It is then pulled out of its dive and put into a zoom until it tail slides. In the tail slide the cap parachute 371 is pulled off from the nose of the casing 357 by the wind during its tail slide and draws off the nose piece 370 causing the main parachutes 363 and 364 to break out of the canister 358. The canister 358 is attached to the main lift wire 365 and is drawn out of the bomb by this wire. The wire 365 then rips its way through the paper strip 368 and out of the groove 369 in the side of the bomb and pulls on the tail of the bomb to which it has previously been fastened, thereby turning the bomb upside down so that the ballast may escape through the hole in the nose of the casing 357 and thus relieve the parachutes 363 and 364 of the major portion of the weight. The bomb on reaching the ground may then be recovered and used again.

Although the aeroplane controlling the flight of the bomb has been described by way of example as equipped with a Lecher wire transmitting set, and the bomb by way of example with a super-regenerative set, other types of transmitting and receiving sets may be used. Also the commutator circuit for effecting modulation of the carrier wave may be modified, and the modulation effected by any other suitable arrangement of commutator circuit.

Again, in some cases jumbling of the wave lengths or variation of the speeds of the synchronised commutators may be used to prevent jamming of the signals radiated from the aeroplane by interference from transmitting sets on the ground.

Also, either modulated waves or interrupted continuous waves may be used, and supersonic modulation of the carrier wave, i. e., about 60000 cycles per second may be used in such modulation and thereby render the signals more difficult to detect.

Any other suitable dielectric may be used for the wing of the bomb instead of timber, also other forms of glider than the low-wing monoplane type may be used for the bomb.

Further, two wings in tandem may be used for the bomb instead of a single wing, one of the wings carrying the receiving aerial and the other wing carrying the reflecting aerial, or the aerial may be mounted on the tail.

Again, modifications may be made in the aerial arrangements, a plurality of aerials and reflectors being employed.

Also, condensers or lenses may be used in conjunction with the flash lamps, and different coloured lamps or different arrangements of lamps may be used to identify the bomb from any particular aircraft, when a number of aircraft are engaged in an attack.

Further, a wind driven dynamo may be used in addition to, or as an alternative to batteries for the supply of electric current for the flash lamps, or for the supply of some or the whole current for the bomb.

As incoming signals will vary in strength with the distance between the bomb and the aeroplane directing it, irregular control due to such variation is avoided by effecting the direction by the duration or length of the signal or control impulses. A volume control circuit may be arranged, if desired, in the transmitting and receiving sets.

Speeds of motors and commutators may be varied from those above described, and mechanical governors may be arranged in the synchronization operation, also other means for synchronizing may be used instead of those hereinbefore described.

The aeroplane transmitting set may be provided with an arrangement for increasing the strength of the radiated impulses or signals with time after the bomb is released so that the impulses or signals received by the bomb will remain of approximately constant strength.

The waisted part of the commutator above described may be arranged to carry more than one pair of triangular segments, or more than three synchronizing contacts. The aeroplane commutator may then be run at a submultiple of the speed of the bomb commutator and thereby obtain finer control.

In the case of the dummy bomb for practice purposes, the parachute main lift wire may be arranged in other ways so as to invert the bomb and release the ballast. Also the ballast may be in the form of cast segments instead of shot.

Although the invention has been described by way of example as applied to the remote control of aerial bombs from an aeroplane, its use is not limited to this application, as it may be applied to the control of bombs from other types of aircraft as well as to the control of other objects.

Modification may be made in detail and arrangement of the invention hereinafter described.

I claim:

1. A remote control apparatus for a dirigible bomb having in combination, means for transmitting radio-frequency signals in different timings repetitively on a single wave band, and means for varying the duration of the individual signals of the same timings at will.

2. A remote control apparatus for a dirigible bomb having in combination, a radio transmitting set including a modulation valve circuit, a circuit controlling said modulation valve circuit, means in said controlling circuit for transmitting radio-frequency signals in different timing relation on a single wave band, and means for varying the duration of the individual signals of the same timing at will.

3. A remote control apparatus for a dirigible bomb having in combination, a radio transmitting set including a modulation valve circuit, a commutator having contacts, each of which varies in its operative length, a plurality of movable brushes spaced angularly around the circumference of said commutator, a control circuit for said modulation valve circuit in which said variable contacts and brushes are connected, and means for rotating said commutator at constant speed.

4. A remote control apparatus for a dirigible bomb, having in combination, a radio-frequency transmitting set including a modulation valve circuit, a commutator having opposed contacts, each of which varies in circumferential length and which extend from a common axial line in opposite directions circumferentially of said commutator, brushes coacting with said variable contacts and capable of being moved to vary the arc of contact therewith, a plurality of contacts on said commutator of equal circumferential length spaced angularly on said commutator, a plurality of fixed brushes coacting with said equal-length contacts and spaced apart in staggered relation to said movable brushes, a circuit controlling said modulation valve circuit in which both sets of brushes and contacts are connected, and means for rotating said commutator at constant speed.

5. In combination, a dirigible bomb, a plurality of flight-controlling means on said bomb, means remote from said bomb for transmitting radio-frequency signals in different timed relation repetitively for controlling the flight of the bomb, means for receiving radio-frequency signals on said bomb, and means for distributing signals according to their timings to the appropriate flight-controlling means.

6. In combination, a dirigible bomb, flight-controlling means on said bomb, means remote from said bomb for transmitting radio-frequency signals in different timed relation, said signal-transmitting means including a commutator running at constant speed, means on said bomb for receiving said signals, means on said bomb including a commutator running at constant speed and having a constant velocity ratio in relation to said signal transmitting commutator, means for distributing said signals in accordance with their timings to appropriate flight-controlling means, and means on said bomb responsive to said signals for operating said selected flight-controlling means.

7. In combination, a dirigible bomb, means on said bomb for controlling its flight, means remote from said bomb for transmitting flight-control signals and for varying the duration of the individual signals at will to correspond to the desired control movement, means on said bomb for operatively positioning said flight-controlling means in response to the duration of said individual signals and for varying the operative position of said flight-controlling means on variation of the duration of the individual signals.

8. In combination, a dirigible bomb, a plurality of flight-controlling means on said bomb, means remote from said bomb for transmitting flight-controlling radio-frequency signals in repetitive cyclic timings, and means on said bomb responsive to said signals for selectively operating said flight-controlling means in accordance with the timings and duration of the individual signals.

9. In a radio-controlled bomb, the combination of aerodynamic control surface means for the bomb, screw-jack means in operative connection with said aerodynamic control surface means, a direct current motor, gearing interconnecting said screw-jack means and said motor, a main battery, circuits interconnecting the armature of said motor and said main battery for bi-directional flow of current through the armature, switch means responsive to different radio-frequency signals for selectively controlling the direction of main battery current through said armature, a bias battery connected in circuit with the field coils of said motor, variable resistance means, circuits connecting said variable resistance means, said bias battery and said armature for bi-directional flow of current from said bias battery through said armature, and means coacting with said screw-jack means on movement from its central position for selectively controlling the current from the bias battery through the armature in accordance with the direction of movement of said screw-jack means from its central position and simultaneously progressively varying the resistance in this circuit as the screw-jack moves from its central position, and on cessation of radio-frequency signals for returning said screw-jack to its central position.

10. In combination, a dirigible bomb having a plurality of movable aerodynamic control surfaces, selectively-operable manual control means remote from said bomb, means coacting with said manual control means for transmitting radio-frequency signals of cyclic timings selected to correspond to the operated manual control means and of a duration proportional to the movement of said operated manual control means, together with means on said bomb responsive to said signals for causing control surfaces corresponding to said operated manual control means to follow proportionally movements of said manual control means.

11. In combination, a dirigible bomb having a plurality of movable aerodynamic control surfaces, selectively-operable manual control means remote from said bomb, means coacting with said manual control means for transmitting radio-frequency signals of cyclic timings selected to correspond to the direction of displacement of the operated manual control means from a central position and of a duration proportional to the extent of said displacement, together with means on said bomb responsive to said signals for causing control surfaces corresponding to said operated manual control means to follow proportionally movements of said manual control means.

12. In combination, a dirigible bomb having a plurality of movable aerodynamic control surfaces, selectively-operable manual control means remote from said bomb, means coacting with said manual control means for transmitting on an interrupted wave band signals of radio-frequency of cyclic timings selected to correspond to the operated manual control means and of a duration proportional to the movement of said operated manual control means, together with means on said bomb responsive to said signals for causing control surfaces corresponding to said operated manual control means to follow proportionally movements of said manual control means.

13. In combination, a dirigible bomb having a plurality of movable aerodynamic control surfaces, selectively-operable manual control means remote from said bomb, means coacting with said control means for transmitting on a modulated wave band signals of radio-frequency of cyclic timings selected to correspond to the operated manual control means and of a duration proportional to the movement of the operated manual control means, together with means on said bomb responsive to said signals for causing control surfaces corresponding to said operated manual control means to follow proportionally movements of said manual control means.

14. In combination, a dirigible bomb, rotary means remote from said bomb for transmitting signals of radio-frequency in different cyclic timings, means on said bomb for receiving said signals, flight-controlling means on said bomb, means for distributing said signals to said flight-controlling means in accordance with the cyclic timing of said signals, and means for maintaining a constant velocity ratio between said signal-transmitting means and said signal-distributing means, said constant velocity ratio maintaining means acting during the movement of said signal-transmitting means and said signal-distributing means.

15. In an aircraft, a transmitting set for signals of radio-frequency, an electric motor, a commutator co-acting with said transmitting set for controlling the transmission of signals, a drive connecting said motor and said commutator, a dirigible bomb carried on said aircraft and having a receiving set for signals of radio-frequency, a commutator on said bomb co-acting with said receiving set for distributing signals received by said set, an electric motor on said bomb, a drive connecting said motor and said bomb commutator, together with means for coupling said drive on said aircraft to said drive on said bomb for running said commutators up to speed in synchronism before launching said bomb.

16. In a remote control apparatus for a dirigible bomb, the combination of rotary means for transmitting signals of radio-frequency in different timed cyclic relation repetitively, certain of said signals recurring in each cycle and certain others of said signals being interpolated between said recurrent signals at will, means on said bomb for receiving said signals, rotary means for distributing received signals in accordance with their timings, means on said bomb for synchronizing the speed of said distributing means thereon with said rotary transmitting means, together with a plurality of flight-controlling means on said bomb, said distributing means distributing said recurrent signals to said synchronizing means and said interpolated signals to said flight-controlling means.

17. In a dirigible bomb, the combination of means for receiving signals of radio-frequency, flight-controlling means, an electric motor for operating said flight-controlling means, irreversible linkage mechanism operatively interconnecting said motor and said flight-controlling means, means responsive to received signals for passing corresponding current impulses in a direction through the armature of said motor according to the signals received, means for energizing the field coils of said motor, together with means co-acting with said energizing means for automatically passing an electric current through said armature in opposition to said impulses on movement of said linkage mechanism from its central position and progressively increasing said current with the displacement of said linkage mechanism from its central position, said current acting on cessation of said impulses to centralize said linkage mechanism and said flight-controlling means.

BERNARD THOMSON.